United States Patent
Nishioka et al.

(10) Patent No.: US 9,598,962 B2
(45) Date of Patent: Mar. 21, 2017

(54) TURBINE ROTOR, MANUFACTURING METHOD THEREOF AND STEAM TURBINE USING TURBINE ROTOR

(71) Applicant: Mitsubishi Hitachi Power Systems, Ltd., Nishi-ku, Yokohama (JP)

(72) Inventors: Eiji Nishioka, Hitachinaka (JP); Kenichi Murata, Hitachi (JP); Kazuhiko Endo, Hitachi (JP); Jun Sato, Yasugi (JP); Toshio Namatame, Hitachi (JP); Shinya Imano, Hitachi (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 773 days.

(21) Appl. No.: 13/923,183

(22) Filed: Jun. 20, 2013

(65) Prior Publication Data

US 2013/0343899 A1    Dec. 26, 2013

(30) Foreign Application Priority Data

Jun. 22, 2012    (JP) .................................. 2012-140472

(51) Int. Cl.
   *F04D 29/04*    (2006.01)
   *F01D 5/08*    (2006.01)
   (Continued)

(52) U.S. Cl.
   CPC ............... *F01D 5/08* (2013.01); *B23K 9/044* (2013.01); *B23K 9/048* (2013.01); *B23K 9/167* (2013.01);
   (Continued)

(58) Field of Classification Search
   None
   See application file for complete search history.

(56) References Cited

U.S. PATENT DOCUMENTS 3,615,370 A * 10/1971 Ridal ..................... C22C 38/54
                                                    420/106
4,962,586 A * 10/1990 Clark ..................... B23K 9/028
                                                    228/208
(Continued)

FOREIGN PATENT DOCUMENTS

CN    1246579 A    3/2000
CN    1958214 A    5/2007
(Continued)

OTHER PUBLICATIONS

Chinese Office Action dated Dec. 12, 2014 with partial English translation (four pages).

(Continued)

*Primary Examiner* — Gregory Anderson
*Assistant Examiner* — Jason Fountain
(74) *Attorney, Agent, or Firm* — Crowell & Moring LLP

(57) ABSTRACT

A turbine rotor includes a high- and low-temperature side rotor base materials. The high- and low-temperature materials include concavities and grooves. The turbine rotor has an enclosed space formed by the concavity of the high- and low-temperature materials being disposed opposingly, and a gap formed by the grooves of the high- and low-temperature materials being disposed opposingly. The turbine rotor contains a buildup welding section formed between the high- and low-temperature materials, which has the same composition as that of the high- or low-temperature material, and has a penetration bead on the enclosed space side, and the gap contains a weld metal filled therein. Thus, a stable penetration bead can be formed in a dissimilar material welded rotor combining two kinds of alloy materials with different thermal properties, and then generation of a non-welded portion of a butting section that becomes a start point of fracture can be suppressed.

14 Claims, 9 Drawing Sheets

(51) Int. Cl.
*B23K 9/04* (2006.01)
*B23K 9/167* (2006.01)
*B23K 9/173* (2006.01)
*F01D 5/06* (2006.01)
*B23P 15/00* (2006.01)

(52) U.S. Cl.
CPC .............. *B23K 9/173* (2013.01); *F01D 5/063* (2013.01); *B23K 2201/001* (2013.01); *B23K 2201/06* (2013.01); *B23P 15/006* (2013.01)

(56) References Cited

U.S. PATENT DOCUMENTS

| | | | |
|---|---|---|---|
| 6,152,697 | A | 11/2000 | Konishi et al. |
| 6,962,483 | B2 * | 11/2005 | Ganesh .................... B21K 1/10 415/200 |
| 2002/0172587 | A1 | 11/2002 | Keller et al. |
| 2008/0011812 | A1 | 1/2008 | Grycko et al. |
| 2009/0001142 | A1 | 1/2009 | Ballal et al. |
| 2010/0028155 | A1 | 2/2010 | Nishioka et al. |
| 2010/0329849 | A1 | 12/2010 | Nishioka et al. |
| 2012/0301309 | A1 * | 11/2012 | Nishioka .............. B23K 9/0026 416/223 R |

FOREIGN PATENT DOCUMENTS

| | | |
|---|---|---|
| CN | 101341001 A | 1/2009 |
| EP | 2 527 073 A1 | 11/2012 |
| JP | 2000-254774 A | 9/2000 |
| JP | 2000-254776 A | 9/2000 |
| JP | 2007-278064 A | 10/2007 |
| JP | 2008-137042 A | 6/2008 |
| JP | 2008-215181 A | 9/2008 |
| JP | 2009-248095 A | 10/2009 |
| JP | 2010-31812 A | 2/2010 |
| JP | 2010-236404 A | 10/2010 |
| JP | 2011-12549 A | 1/2011 |
| JP | 2012-30237 A | 2/2012 |
| JP | 2012-61498 A | 3/2012 |
| JP | 2012-240108 A | 12/2012 |

OTHER PUBLICATIONS

European Search Report issued in counterpart European Application No. 13172975.8 dated Oct. 25, 2016 (eight pages).

* cited by examiner

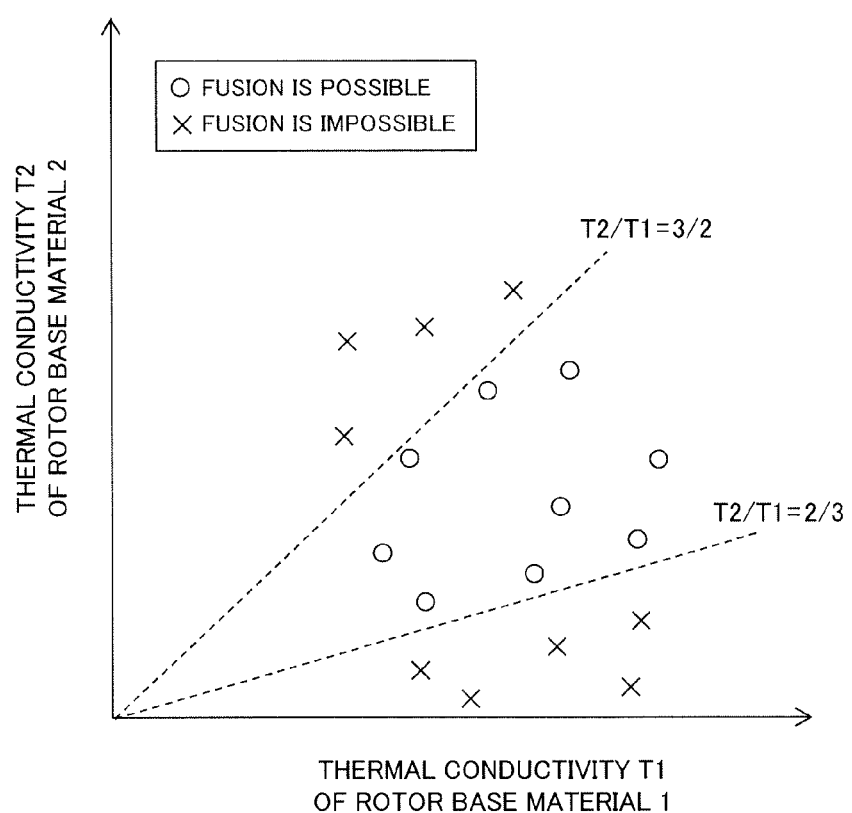

TURBINE ROTOR, MANUFACTURING METHOD THEREOF AND STEAM TURBINE USING TURBINE ROTOR

CLAIM OF PRIORITY

The present application claims priority from Japanese Patent application serial No. 2012-140472, filed on Jun. 22, 2012, the content of which is hereby incorporated by reference into this application.

BACKGROUND OF THE INVENTION (Field of the Invention)

The present invention relates to a turbine rotor having a dissimilar metal weld section, manufacturing method thereof and a steam turbine using the turbine rotor.

(Description of Related Art)

A steam turbine is composed of a boiler, a turbine rotor, moving blades, a generator, and the like.

In a large turbine rotor, high temperature creep rupture strength is required on its high pressure side and tensile strength and toughness are required on its low pressure side in addition to that the axial length becomes long. Therefore, when the steam turbine rotor was to be formed of one material, it was difficult to obtain characteristic satisfying these respective requirements. Particularly, iron-based alloys of prior arts are approaching the limit as a material of the high pressure side rotor accompanying rising of the steam temperature.

Therefore, use of a Ni-based super alloy superior to the iron-based alloys in heat resistance has been studied. However, the Ni-based super alloy is inferior to the iron-based alloy in terms of manufacturability of a large block, workability, cost, availability and the like.

Thus, a manufacturing method is known in which the high pressure side rotor is formed of the Ni-based super alloy material excellent in heat resistance, the low pressure side rotor is formed of the iron-based alloy material excellent in tensile strength and toughness, and these materials are integrated by welding.

However, when a rotor is to be welded, it is necessary to form a weld bead or so-called penetration bead formed on the rear side of the weld section in a butting section which is positioned in the bottom section of the weld section and welded first. When the penetration bead is not formed, a non-welded section remains in the butting section which may amplify the rupture potential during operation.

Therefore, when the rotor is to be welded, it is necessary to form the penetration bead. However, when combination of the rotor material is of dissimilar materials particularly combination of the Ni-based alloy material and the iron-based alloy material, difference in thermal property value of the both becomes a problem. In this case, (1) movement of an element due to difference in the additive element, (2) securing the mechanical property even when the heat treatment condition is different and (3) formation of the penetration bead even when the thermal conductivity is different become the problems.

With respect to the problems of (1) and (2), solutions are described in Japanese Unexamined Patent Application Publication No. 2008-215181 (Patent Document 1), Japanese Unexamined Patent Application Publication No. 2000-254774 (Patent Document 2), Japanese Unexamined Patent Application Publication No. 2000-254776 (Patent Document 3), and Japanese Unexamined Patent Application Publication No. 2009-248095 (Patent Document 4).

Patent Document 1 discloses a turbine rotor using 12% Cr-based steel having a totally tempered martensitic structure and Cr—Mo—V-based steel having a bainitic structure as rotor base materials with the butting section thereof being joined to each other via a weld section, in which the hardness distribution of a buttering layer arranged in the butting section is kept within a predetermined range.

Patent Document 2 discloses a technology of a method for welding dissimilar materials of welding and joining Cr—Mo—Fe-based heat-resistant steel having been used for a long period in a hydrogen gas atmosphere with a new Ni—Cr—Fe-based heat-resistant alloy in which the vicinity of the joining section of the Cr—Mo—Fe-based heat-resistant steel is subjected to a dehydrogenation treatment by being heated to a predetermined temperature.

Patent Document 3 discloses a method for preventing a stress corrosion crack of a weld section of piping inside a nuclear reactor forming a fusion/solidification layer within a range of a predetermined depth from the inner surface or the outer surface of the weld section when stainless steel pipes are to be butt-welded.

Patent Document 4 discloses a method for welding two kinds of Ni-based welding materials one by one with respect to steel.

Japanese Unexamined Patent Application Publication No. 2012-61498 (Patent Document 5) discloses a technology for setting a rotor shaft of low alloy steel and a turbine vane of a Ni-based super alloy integrated by fitting a projection and a concavity to each other in an aligned state, and thereafter subjecting the butting portion to welding over the entire periphery while being rotated around the axis of the rotor shaft.

SUMMARY OF THE INVENTION

The present invention is a turbine rotor which includes: a high temperature side rotor base material; and a low temperature side rotor base material. The high temperature side rotor base material and the low temperature side rotor base material respectively include concavities and grooves. The turbine rotor has an enclosed space section formed by the concavity of the high temperature side rotor base material and the concavity of the low temperature side rotor base material being disposed opposingly, and a gap formed by the groove of the high temperature side rotor base material and the groove of the low temperature side rotor base material being disposed opposingly. The turbine rotor contains a buildup welding section formed between the high temperature side rotor base material and the low temperature side rotor base material. The buildup welding section has the same composition as that of the high temperature side rotor base material or the low temperature side rotor base material, and has a penetration bead on the enclosed space section side, and the gap contains a weld metal filled therein.

According to the present invention, a stable penetration bead can be formed in a dissimilar material welded rotor combining two kinds of alloy materials different in thermal property, and then generation of a non-welded portion of a butting section that becomes a start point of fracture can be suppressed, generation frequency of a defect can be reduced, and strength reliability of the turbine rotor that is a large welded structure can be improved.

BRIEF DESCRIPTION OF THE DRAWINGS

FIG. 3 is a graph showing the correlation of the thermal conductivity of two rotor base materials;

DETAILED DESCRIPTION OF THE PREFERRED EMBODIMENTS

Figure 1:
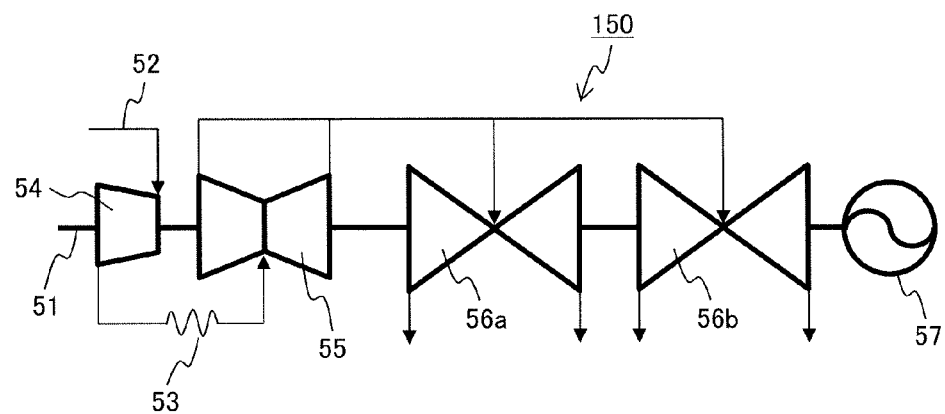
FIG. 1 is a schematic drawing showing a constitution of a steam turbine.

In the weld section described in Patent Documents 1 to 4, the problems of the dissimilar weld section have been eliminated by executing preparatory work before buttering, stacking welding materials different in chemical composition in the thickness direction, and the like.

However, in the welded rotor, it is important to stably form the penetration bead that is the problem peculiar to the welded rotor of the item (3) in the above "Description of Related Art" in addition to solving these problems. The reason is that the inside of the weld rotor is hollow. When formation of the penetration bead is failed, grinding from the rear surface is impossible, and the weld section must be cut and removed over the cross section. Also, when the penetration bead cannot be formed properly and a non-welded portion is generated in the butting section, a fracture starting from the non-welded portion may be caused.

In addition to such problems peculiar to the welded rotor, there is a problem of big difference in thermal property particularly in thermal conductivity when the rotor material is of the combination of the Ni-based alloy material and the iron-based alloy material. Because difference in the thermal property causes difference in fusion behavior between both materials, formation of the penetration bead is difficult.

The object of the present invention is to securely form a penetration bead hardly causing a crack when there is an enclosed space section of a rotor in the vicinity of a weld section in a dissimilar material welded rotor combining two kinds of alloy materials.

The present inventor studied a scheme for forming a penetration bead in a butting section of a welded rotor combining a Ni-based alloy material and an iron-based alloy material. As a result, an idea was conceived in which the butting section and a range where heat was transferred when the penetration bead was formed were constituted of a same kind material. More specifically, fusing behaviors of two rotor base materials easily become similar to each other by making the butting section of a same kind material. the temperatures in the vicinity of the butting section of two rotor base materials easily become similar to each other by making heat transferred range of a same kind material.

Based on this result, a weld section of an iron-based alloy material was arranged beforehand in the butting section of the rotor base material of the Ni-based alloy material (high temperature side rotor base material) and the rotor base material of the iron-based alloy material (low temperature side rotor base material) constituting the rotor obtained by joining two kinds of dissimilar materials (dissimilar material welded rotor), and a penetration bead was configured to be formed on the hollow section side of the rotor formed by making two rotor base materials butt against each other.

Below, a turbine rotor and its manufacturing method in relation with an embodiment of the present invention will be described.

It is characterized that the turbine rotor includes a high temperature side rotor base material and a low temperature side rotor base material, the high temperature side rotor base material includes a concavity and a groove, the low temperature side rotor base material includes a concavity and a groove, the concavity of the high temperature side rotor base material and the concavity of the low temperature side rotor base material are opposingly disposed and an enclosed space section is formed between these concavities, the groove of the high temperature side rotor base material and the groove of the low temperature side rotor base material are opposingly disposed and a gap is formed between these grooves, a buildup welding section having a composition same to that of the high temperature side rotor base material or the low temperature side rotor base material is included between the high temperature side rotor base material and the low temperature side rotor base material, the buildup welding section includes a penetration bead on the enclosed space section side, and a weld metal is filled in the gap.

In the turbine rotor, it is preferable that a ratio of the thermal conductivity of the high temperature side rotor base material and the low temperature side rotor base material is in the range of 2/3 to 3/2.

In the turbine rotor, it is preferable that the high temperature side rotor base material includes an entire surface buttering section on the surface of the groove.

In the turbine rotor, it is preferable that the high temperature side rotor base material is of a nickel-based alloy containing cobalt (Co): 5 to 15 mass %, chromium (Cr): 13 to 15.5 mass %, aluminum (Al): 4.0 to 5.5 mass %, titanium (Ti): 0.1 to 2.0 mass %, niobium (Nb): 0.1 to 1.0 mass %, tantalum (Ta): 0.1 to 3.0 mass %, molybdenum (Mo): 0.1 to 2.0 mass %, tungsten (W): 4.5 to 10 mass %, hafnium (Hf): 0.1 to 2.0 mass %, carbon (C): 0.05 to 0.20 mass %, boron (B): 0.001 to 0.03 mass %, and zirconium (Zr): 0.01 to 0.1 mass %, with the balance being nickel (Ni) and unavoidable impurities (inevitable impurities). Herein, "mass %" means a percentage by mass.

In the turbine rotor, it is preferable that the high temperature side rotor base material is of a nickel-iron-based alloy containing iron (Fe): 30 to 40 mass %, chromium (Cr): 14 to 16 mass %, titanium (Ti): 1.2 to 1.7 mass %, aluminum (Al): 1.1 to 1.5 mass %, niobium (Nb): 1.9 to 2.7 mass %, and carbon (C): 0.05 mass % or less, with the balance being nickel (Ni) and unavoidable impurities.

In the turbine rotor, it is preferable that the low temperature side rotor base material is of 12% chromium steel having a totally tempered martensitic structure containing carbon (C): 0.1 to 0.2 mass %, manganese (Mn): 0.3 to 1.0 mass %, nickel (Ni): 1 mass % or less, chromium (Cr): 9 to 13 mass %, molybdenum (Mo): 0.1 to 1.5 mass %, tungsten (W): 0.2 to 5.0 mass %, niobium (Nb): 0.02 to 0.1 mass %, and cobalt (Co): 3 mass % or less.

In the turbine rotor, it is preferable that the low temperature side rotor base material is of 1% chromium-molybdenum-vanadium steel having a bainitic structure containing carbon (C): 0.25 to 0.35 mass %, manganese (Mn): 0.5 to 1 mass %, nickel (Ni): 1 mass % or less, chromium (Cr): 0.8 to 1.5 mass %, molybdenum (Mo): 1.0 to 1.5 mass %, and vanadium (V): 0.2 to 0.3 mass %.

In the turbine rotor, it is preferable that the high temperature side rotor base material is of a nickel-based alloy containing cobalt (Co): 5 to 15 mass %, chromium (Cr): 13 to 15.5 mass %, aluminum (Al): 4.0 to 5.5 mass %, titanium (Ti): 0.1 to 2.0 mass %, niobium (Nb): 0.1 to 1.0 mass %, tantalum (Ta): 0.1 to 3.0 mass %, molybdenum (Mo): 0.1 to 2.0 mass %, tungsten (W): 4.5 to 10 mass %, hafnium (Hf): 0.1 to 2.0 mass %, carbon (C): 0.05 to 0.20 mass %, boron (B): 0.001 to 0.03 mass %, and zirconium (Zr): 0.01 to 0.1 mass %, with the balance being nickel (Ni) and unavoidable impurities, and the low temperature side rotor base material is of 12% chromium steel having a totally tempered martensitic structure containing carbon (C): 0.1 to 0.2 mass %, manganese (Mn): 0.3 to 1.0 mass %, nickel (Ni): 1 mass % or less, chromium (Cr): 9 to 13 mass %, molybdenum (Mo): 0.1 to 1.5 mass %, tungsten (W): 0.2 to 5.0 mass %, niobium (Nb): 0.02 to 0.1 mass %, and cobalt (Co): 3 mass % or less, or of 1% chromium-molybdenum-vanadium steel having a bainitic structure containing carbon (C): 0.25 to 0.35 mass %, manganese (Mn): 0.5 to 1 mass %, nickel (Ni): 1 mass % or less, chromium (Cr): 0.8 to 1.5 mass %, molybdenum (Mo): 1.0 to 1.5 mass %, and vanadium (V): 0.2 to 0.3 mass %.

In the turbine rotor, it is preferable that the high temperature side rotor base material is of a nickel-based alloy containing cobalt (Co): 5 to 15 mass %, chromium (Cr): 13 to 15.5 mass %, aluminum (Al): 4.0 to 5.5 mass %, titanium (Ti): 0.1 to 2.0 mass %, niobium (Nb): 0.1 to 1.0 mass %, tantalum (Ta): 0.1 to 3.0 mass %, molybdenum (Mo): 0.1 to 2.0 mass %, tungsten (W): 4.5 to 10 mass %, hafnium (Hf): 0.1 to 2.0 mass %, carbon (C): 0.05 to 0.20 mass %, boron (B): 0.001 to 0.03 mass %, and zirconium (Zr): 0.01 to 0.1 mass %, with the balance being nickel (Ni) and unavoidable impurities; or of a nickel-iron-based alloy containing iron (Fe): 30 to 40 mass %, chromium (Cr): 14 to 16 mass %, titanium (Ti): 1.2 to 1.7 mass %, aluminum (Al): 1.1 to 1.5 masse, niobium (Nb): 1.9 to 2.7 mass %, and carbon (C): 0.05 mass % or less; with the balance being nickel (Ni) and unavoidable impurities, and the low temperature side rotor base material is of 12% chromium steel having a totally tempered martensitic structure containing carbon (C): 0.1 to 0.2 mass %, manganese (Mn): 0.3 to 1.0 mass %, nickel (Ni): 1 mass or less, chromium (Cr): 9 to 13 mass %, molybdenum (Mo): 0.1 to 1.5 mass %, tungsten (W): 0.2 to 5.0 mass %, niobium (Nb): 0.02 to 0.1 mass %, and cobalt (Co): 3 mass % or less, or of 1% chromium-molybdenum-vanadium steel having a bainitic structure containing carbon (C): 0.25 to 0.35 mass %, manganese (Mn): 0.5 to 1 mass %, nickel (Ni): 1 mass % or less, chromium (Cr): 0.8 to 1.5 mass %, molybdenum (Mo): 1.0 to 1.5 mass %, and vanadium (V): 0.2 to 0.3 mass %.

In the turbine rotor, it is preferable that the high temperature side rotor base material is of a nickel-based alloy containing cobalt (Co): 5 to 15 mass %, chromium (Cr): 13 to 15.5 mass %, aluminum (Al): 4.0 to 5.5 mass %, titanium (Ti): 0.1 to 2.0 mass %, niobium (Nb): 0.1 to 1.0 mass %, tantalum (Ta): 0.1 to 3.0 mass %, molybdenum (Mo): 0.1 to 2.0 mass %, tungsten (W): 4.5 to 10 mass %, hafnium (Hf): 0.1 to 2.0 mass %, carbon (C): 0.05 to 0.20 mass %, boron (B): 0.001 to 0.03 mass %, and zirconium (Zr): 0.01 to 0.1 mass %, with the balance being nickel (Ni) and unavoidable impurities, or of a nickel-iron-based alloy containing iron (Fe): 30 to 40 mass %, chromium (Cr): 14 to 16 mass %, titanium (Ti): 1.2 to 1.7 mass %, aluminum (Al): 1.1 to 1.5 mass %, niobium (Nb): 1.9 to 2.7 mass %, and carbon (C): 0.05 mass % or less, with the balance being nickel (Ni) and unavoidable impurities, and the low temperature side rotor base material is of 12% chromium steel having a totally tempered martensitic structure containing carbon (C): 0.1 to 0.2 mass %, manganese (Mn): 0.3 to 1.0 mass %, nickel (Ni): 1 mass % or less, chromium (Cr): 9 to 13 mass %, molybdenum (Mo): 0.1 to 1.5 mass %, tungsten (W): 0.2 to 5.0 mass %, niobium (Nb): 0.02 to 0.1 mass %, and cobalt (Co): 3 mass % or less.

It is characterized that a manufacturing method of the turbine rotor includes a buttering buildup step for subjecting a butting section of the high temperature side rotor base material or the low temperature side rotor base material to buttering buildup, a penetration bead forming step for fusing the butting section and forming the penetration bead, and a regular welding step for filling the gap with the weld metal.

In the manufacturing method of the turbine rotor, it is preferable to execute a groove working step for subjecting the high temperature side rotor base material and the low temperature side rotor base material to groove work after the buttering buildup step, and to execute the penetration bead forming step thereafter.

In the manufacturing method of the turbine rotor, it is preferable to execute a buttering step for forming an entire surface buttering section on the surface of the groove of the high temperature side rotor base material, and to execute the buttering buildup step thereafter.

The turbine rotor can be used for a steam turbine.

FIG. 1 is a schematic drawing showing a constitution of a steam turbine.

In the present drawing, a steam turbine 150 is configured that a high pressure turbine 54, an intermediate pressure turbine 55 and two low pressure turbines 56a, 56b are attached to a turbine rotor 51 (steam turbine rotor). Also, a generator 57 is attached to the end of the turbine rotor 51.

It is configured that steam is introduced to the high pressure turbine 54 from a main steam pipe 52. It is configured that steam having rotated the high pressure turbine 54 is heated by a boiler repeater 53 and is introduced to the intermediate pressure turbine 55. Also, it is configured that steam having rotated the intermediate pressure turbine 55 is introduced to the low pressure turbines 56a, 56b and rotates the low pressure turbines 56a, 56b. The generator 57 converts rotation energy (kinetic energy) of the turbine rotor 51 to electric energy.

Also, the high pressure turbine 54 may be a high/intermediate pressure turbine.

Figure 2A:
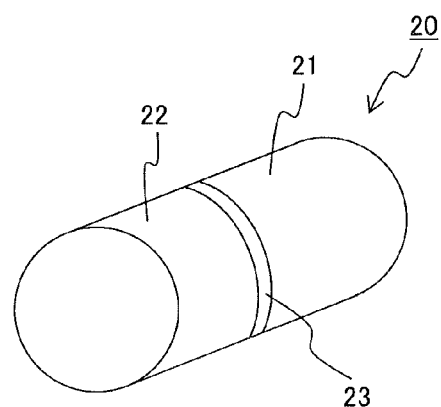
FIG. 2A is a partial perspective view showing a shape of a rotor.

FIG. 2A is a partial perspective view showing the shape of a rotor.

In the present drawing, a turbine rotor 20 includes a weld section 23 that is a portion where a high temperature side rotor base material 21 and a low temperature side rotor base material 22 are joined to each other by butt welding.

the area where the ratio of the thermal conductivity of two rotor base materials becomes 2/3 to 3/2.

On the other hand, when the ratio of the thermal conductivity of two rotor base materials was less than 2/3 or exceeded 3/2, the butting section could not fuse by same heat input quantity.

In the combination of the two rotor base materials in the present example, the difference of the thermal conductivity was approximately 4.4 times. This fact results that the butting section cannot fuse by same heat input quantity.

Table 1 shows the kind of the alloy and the composition range of the rotor base materials constituting the dissimilar material welded rotor.

TABLE 1

| Rotor parent material | C | Mn | Ni | Cr | Mo | W | Nb | Co | B |
|---|---|---|---|---|---|---|---|---|---|
| Ni-based super alloy | 0.05~0.20 | | bal. | 13~15.5 | 0.1~2.0 | 4.5~10 | 0.1~1.0 | 5~15 | 0.001~0.03 |
| Ni—Fe-based super alloy | ≤0.05 | | bal. | 14~16 | | | 1.9~2.7 | | |
| 12% Cr steel | 0.1~0.2 | 0.3~1.0 | ≤1 | 9~13 | 0.1~1.5 | 0.2~5.0 | 0.02~0.1 | ≤3 | |
| 1% Cr—Mo—V steel | 0.25~0.35 | 0.5~1 | ≤1 | 0.8~1.5 | 1.0~1.5 | | | | |

| Rotor parent material | V | Ti | Al | Ta | Hf | Zr | Fe |
|---|---|---|---|---|---|---|---|
| Ni-based super alloy | | 0.1~2.0 | 4.0~5.5 | 0.1~3.0 | 0.1~2.0 | 0.01~0.1 | |
| Ni—Fe-based super alloy | | 1.2~1.7 | 1.1~1.5 | | | | 30~40 |
| 12% Cr steel | | | | | | | bal. |
| 1% Cr—Mo—V steel | 0.2~0.3 | | | | | | bal. |

Figure 2B:
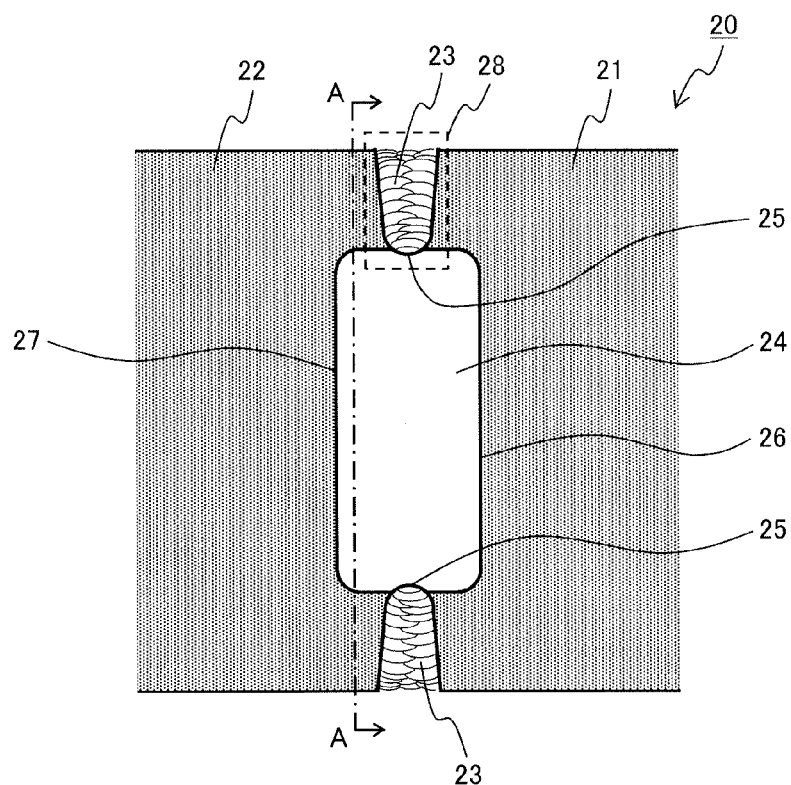
FIG. 2B is a cross-sectional view showing a weld section of two rotor base materials.

FIG. 2B shows a cross-section in the longitudinal direction of the turbine rotor of FIG. 2A, and shows the internal structure of the turbine rotor.

In the present drawing, the high temperature side rotor base material 21 and the low temperature side rotor base material 22 include concavities 26, 27 of a generally cylindrical shape respectively. Also, the concavities 26, 27 after welding form a closed space section 24 that is a hollow section of the turbine rotor 20. The closed space section 24 becomes such a state that there is no circulation of air to the outside of the turbine rotor 20 and the like. A penetration bead 25 is formed on the closed space section 24 side of the weld section 23. The penetration bead 25 contributes to improvement of the joining strength of the weld section 23.

Also, a dotted line section 28 is a portion illustrated for the purpose of explanation of the welding step described below.

In the present drawing, the shape of the concavities 26, 27 was made generally cylindrical, however, the shape of the concavities 26, 27 is not limited to it and may be a semi-spherical shape, circular conical shape, triangular pyramid shape, quadrangular pyramid shape, other polygonal pyramid shape, and the like.

Figure 2C:
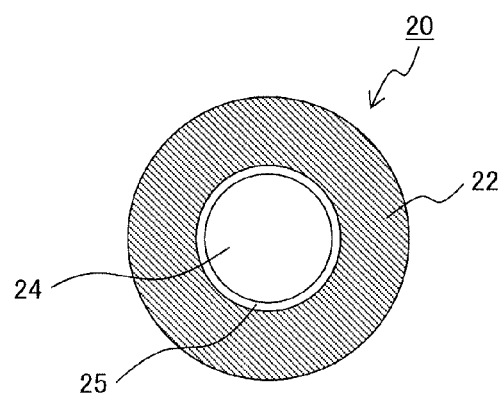
FIG. 2C is a cross-sectional view taken from line A-A of FIG. 2B.

FIG. 2C is a cross-sectional view taken from line A-A of FIG. 2B.

In the present drawing, the penetration bead 25 is formed into a ring shape toward the center part of the closed space section 24 of the turbine rotor 20.

FIG. 3 is a graph showing the correlation of the thermal conductivity of two rotor base materials. The lateral axis is set as the thermal conductivity T1 of the rotor base material 1, and the vertical axis is set as the thermal conductivity T2 of the rotor base material 2.

In the present drawing, a region is also shown in which the butting section of two rotor base materials could fuse by same heat input quantity in a preparatory test. The region is Description will be made below using examples.

Example 1

The present example relates to an example employing the Ni-based super alloy and 12% Cr steel out of the rotor base materials shown in Table 1 and welding them.

Figure 4:
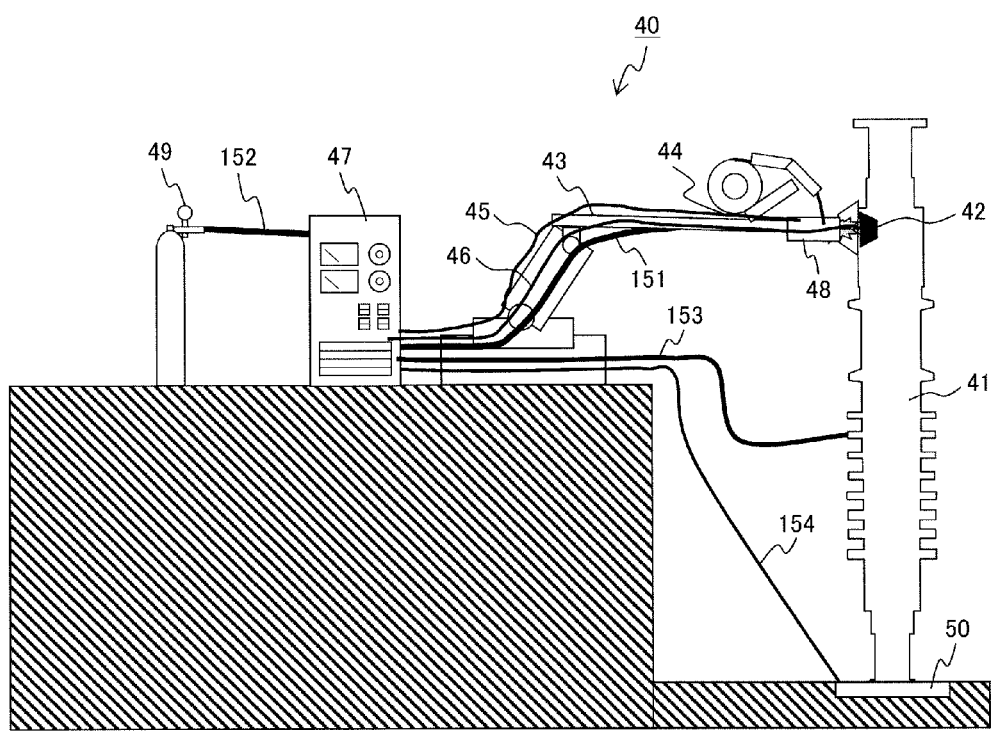
FIG. 4 is a schematic side view showing a tungsten-inert gas welding machine used for welding a turbine rotor.

FIG. 4 shows the outline of a tungsten-inert gas welding machine used for welding a turbine rotor as an example.

In the present drawing, a welding machine 40 includes a drive unit 43, a welding unit 44, a torch 48 and a control unit 47, and a gas bombe 49 is connected via a gas hose 152. It is configured that inert gas of the gas bombe 49 is transferred to the torch 48 via a gas hose 151. Nitrogen, argon or the like is used as the inert gas. A signal cable 45 transmitting and receiving signals is arranged between the drive unit 43 and the control unit 47. A signal cable 46 transmitting and receiving signals is arranged between the welding unit 44 and the control unit 47.

A turbine rotor 41 is arranged in a positioner 50 and is rotatable around the axis of the turbine rotor 41. The positioner 50 is connected to the control unit 47 via a signal cable 154 and is configured to be capable of rotating the turbine rotor 41 by the control unit 47.

Also, an earth cable 153 is connected to the turbine rotor 41, and the electric potential of the turbine rotor 41 is suppressed from varying in welding.

The welding unit 44 is movable at least in the axial direction of the turbine rotor 41 by the drive unit 43, and is configured so as to execute welding while making the torch 48 approach the weld section 42 of the turbine rotor 41.

Although the drive unit 43 shown in the present drawing is of a self standing type that moves while being tightly attached to a welding structure (turbine rotor 41), other types configured so that the drive unit 43 moves by an external force such as a scanning arm and the like for example are also applicable.

In the present example, the tungsten-inert gas welding (TIG welding) with 20 kJ/cm heat input quantity was employed, however, other methods such as submerged arc welding (SAW), shielded metal arc welding (SMAW), metal inert gas welding (MIG welding), laser beam welding (LBW), CMT (cold metal transfer) may also be used for example.

Figure 5:
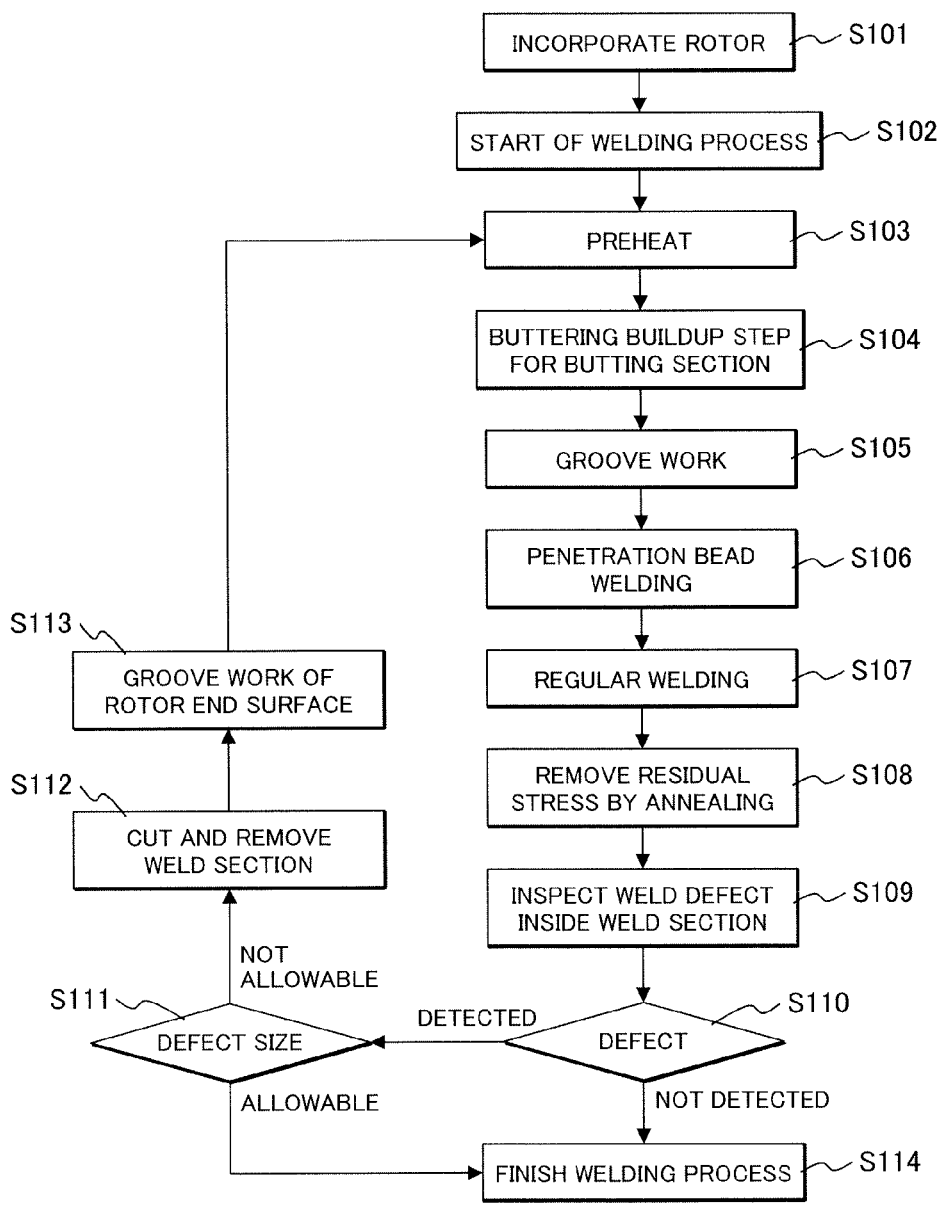
FIG. 5 is a flowchart showing a welding process of example 1.

FIG. 5 is a flowchart showing the welding step of the turbine rotor of the present example.

First, one rotor base material is incorporated into another rotor base material (S101). Next, start of the welding process is instructed (S102). In order to relax the thermal stress in welding, the rotor base material is preheated (S103). With respect to the system used in the preheating, an electric furnace, gas burner, high frequency induction heater and the like can be cited, however, other systems are also applicable.

Further, buttering buildup is executed with respect to one rotor base material using the welding unit shown in FIG. 4 (buttering buildup step S104). Thereafter, the buttering buildup and a part of two rotor base materials are subjected to groove work (groove work step S105). After the buttering buildup of one rotor base material and the other rotor base material are made butt against each other and are aligned to each other, penetration bead welding is executed by heating the butting section that is the contact section of the buttering buildup of one rotor base material and the other rotor base material from the outside of the rotor (penetration bead forming step S106).

Thereafter, the gap formed between the grooves of the two rotor base materials is subjected to regular welding, and the weld section is formed (regular welding step S107). Also, annealing is executed in order to remove the residual stress of the weld section formed in regular welding (S108). With respect to the system used then, an electric furnace, gas burner, high frequency induction heater and the like can be cited, however, other systems are also applicable.

Thereafter, weld defect inspection for the weld section is executed (S109). With respect to the inspection method, the penetrant test (PT), visual test (VT), ultrasonic test (UT), radiographic test (RT), magnetic particle test (MT) and the like can be cited, however, other methods are also applicable.

Presence/absence of the defect is determined (S110). When a defect has been detected, whether the defect size is allowable or not from the aspect of the mechanical strength is determined (S111). When it is not allowable, the weld section is cut and removed (S112), the end surface of the rotor is subjected to groove work (S113), and the process returns to the preheating step (S103).

When the defect is not detected in determination of presence/absence of the defect (S110) or when the defect size is within the allowable range in determination of the defect size (S111), the welding process is finished (S114).

Figure 6:
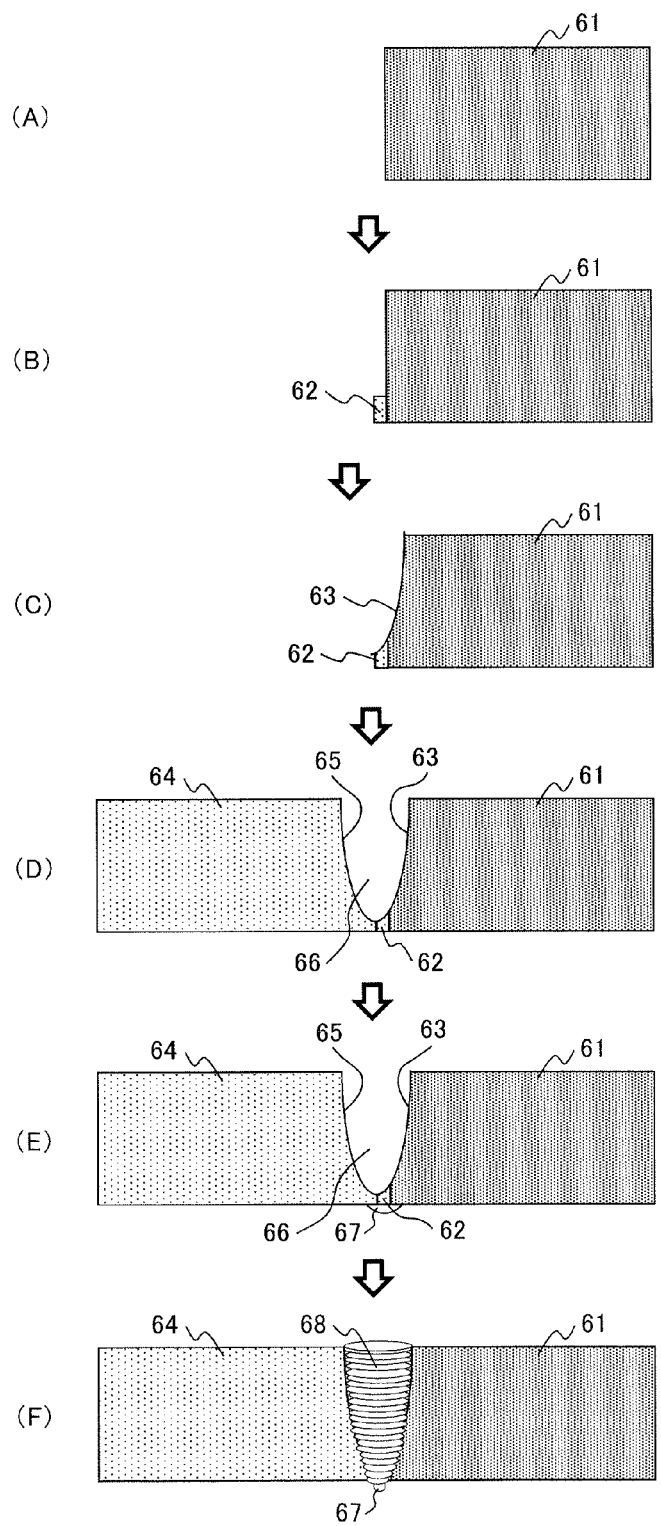
FIG. 6 is a continuous cross-sectional view showing the welding process of example 1.

FIG. 6 is a partial enlarged cross-sectional view continuously showing the welding step of FIG. 5.

In the present drawing, the dotted line section 28 of FIG. 2B is enlarged, deformed into a flat plane shape, and is shown in (A) to (F). The present drawing shows the case two rotor base materials with different material on the high temperature side and the low temperature side are welded to each other.

(A) shows a state of a high temperature side rotor base material 61 formed of the Ni-based super alloy before welding.

The thickness of the rotor base material 61 is preferable to be 100 mm or more so as to be capable of standing the rotational force, centrifugal force and own weight of the rotor. The diameter of the rotor depends on the output of the turbine rotor and the like, and is preferable to be 500 mm or more and 13,000 mm or less (500 to 13,000 mm) due to the restriction of segregation, forgeability and the like in manufacturing the raw material.

(B) is a state a buildup section 62 is arranged by buttering buildup in the butting section of the rotor base material 61 using the deposited metal (welded metal) with a composition same to that of the low temperature side rotor base material. The buildup section 62 is formed in the peripheral direction of the rotor at the portion contacting the hollow section of the rotor base material 61. This corresponds to S104 of FIG. 5.

With respect to the buildup section 62 in the present example, the thickness in the axial direction of the rotor was made 10 mm, however, it only has to be the thickness same to or thicker than the same (10 mm or more). In case that the thickness is less than 10 mm, a portion having a high dilution ratio of the buildup section 62 remains in the following groove work step S105. This is not preferable. However, the buildup section 62 is preferable to be thinner, and 15 mm is enough even when it is thick.

Further, in the present example, although the width of the buildup section 62 extending in the radial direction of the rotor base material 61 was made 10 mm from the position contacting the hollow section of the rotor base material 61, it only has to be same to or greater than the width of the face the low temperature side rotor base material having been subjected to groove work contacts by butting (the width of the butting section) which is the width required after the groove work S105, or 2 mm or more for example. When the width of the buildup section 62 is less than 2 mm, in forming the penetration bead by butting against the base material of the counterpart side, difference occurs in thermal conductivity property, and stable penetration bead cannot be formed which is not preferable. However, the width of the buildup section 62 is preferable to be short, and 5 mm is enough at the longest.

(C) is a state a groove 63 is formed by subjecting groove work of S105 of FIG. 5 and cutting and removing a part of the base material 20 and the buildup section 62.

By this step, the groove 63 is worked into a shape same to that of the groove of the low temperature side rotor base material having been subjected to groove work, and stable welding becomes possible.

(D) shows a state the high temperature side rotor base material 61 and a low temperature side rotor base material 64 that is the counterpart side are made butt against each other. The low temperature side rotor base material 64 and the buildup section 62 contact each other. Also, a gap 66 is formed by the grooves 63 and 65 of the high temperature side rotor base material 61 and the low temperature side rotor base material 64.

(E) is a state a penetration bead 67 is formed on the hollow section side in a state the high temperature side rotor base material 61 and the low temperature side rotor base material 64 butt against each other.

(F) shows a state the gap 66 formed by the grooves 63 and 65 of the high temperature side rotor base material 61 and the low temperature side rotor base material 64 is subjected to butt welding using a weld metal 68.

Although an example the buildup welding section 62 was arranged in the high temperature side rotor base material 61 was shown in the present example, according to the chemical composition and the heat treatment condition, the buildup welding section can be arranged in the low temperature side rotor base material 64. In this case, buttering buildup is subjected using a weld metal with a composition same to that of the high temperature side rotor base material 61. Here, the weld metal 68 is a Ni-based alloy containing Co: 12 to 25%, Cr: 10 to 18%, Al: 2.0 to 3.6%, Mo+W: 5.0 to 10%, C: 0.01 to 0.15%, B: 0.001 to 0.03% with the balance being Ni and unavoidable impurities.

Example 2

As shown in FIG. 6, in example 1, the buildup welding section 62 is directly applied to the surface of the rotor base material 61. On the other hand, the present example is characterized that the groove of the high temperature side rotor base material is subjected to buttering beforehand in order to eliminate the difference in the chemical composition, heat treatment condition and the like between the high temperature side rotor base material and the low temperature side rotor base material. Here, description on the points identical to those of example 1 will be omitted, and only the points different from example 1 will be described.

Figure 7:
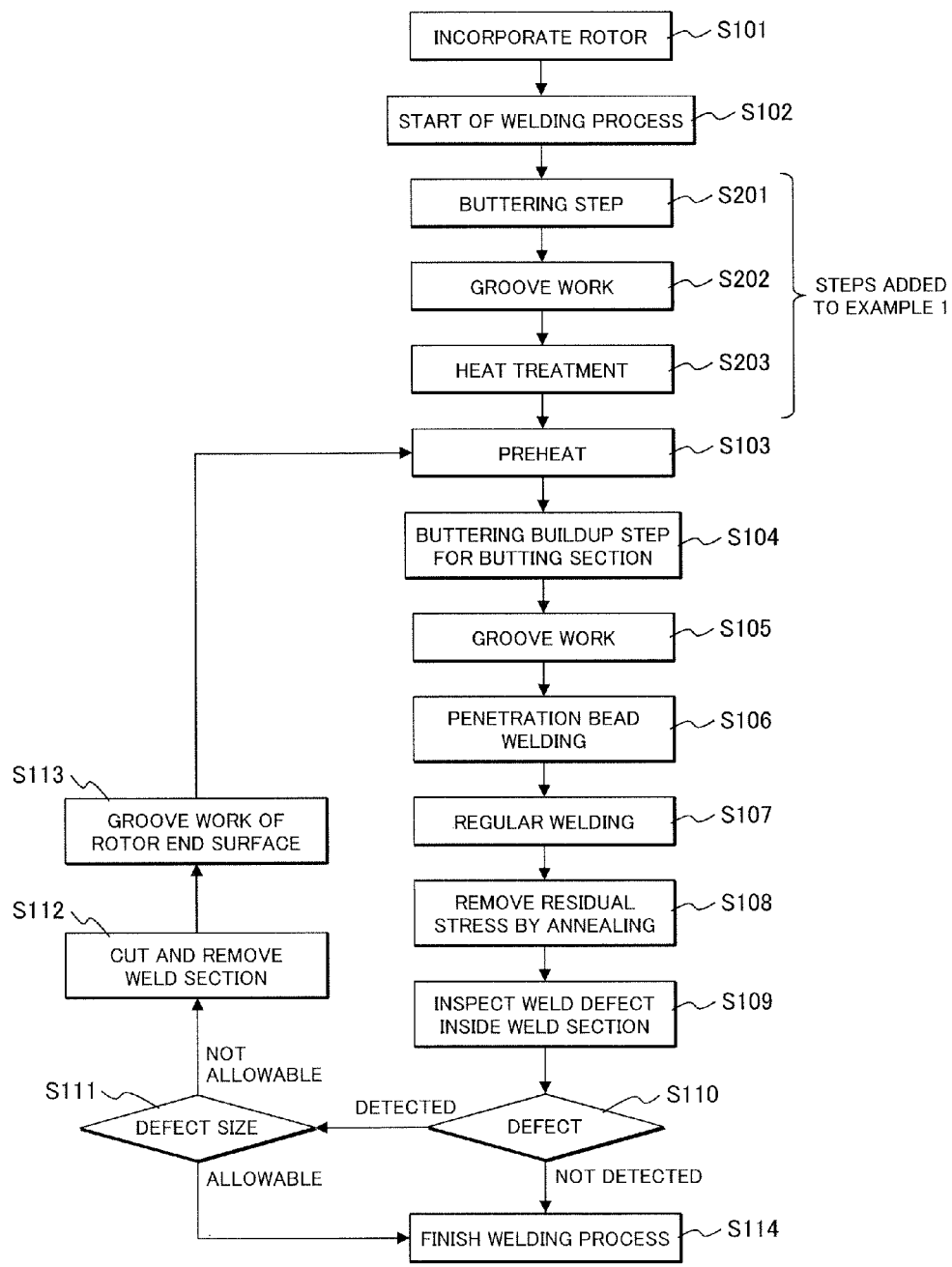
FIG. 7 is a flowchart showing a welding process of example 2.

FIG. 7 is a flowchart showing the welding step of the turbine rotor of the present example.

The steps added in the present example are S201 to S203 when compared to example 1.

First, S101 and S102 are executed similarly to example 1.

In buttering step S201, the entire surface of the groove arranged in the high temperature side rotor base material beforehand is subjected to buttering, and an entire surface buttering section is arranged. The reason of doing so is for relaxing the difference in the chemical composition and heat treatment condition between the high temperature side rotor base material and the low temperature side rotor base material.

In groove work S202, the entire surface buttering section is subjected to groove work. Thereafter, the high temperature side rotor base material and the entire surface buttering section are subjected to heat treatment S203. Heat treatment S203 is for securing the strength suitable to the high temperature side rotor base material, and is disadvantageous for the low temperature side rotor base material. Therefore, heat treatment S203 should be executed before the low temperature side rotor base material is welded to the high temperature side rotor base material. S103 and onward are similar to those of example 1.

Figure 8:
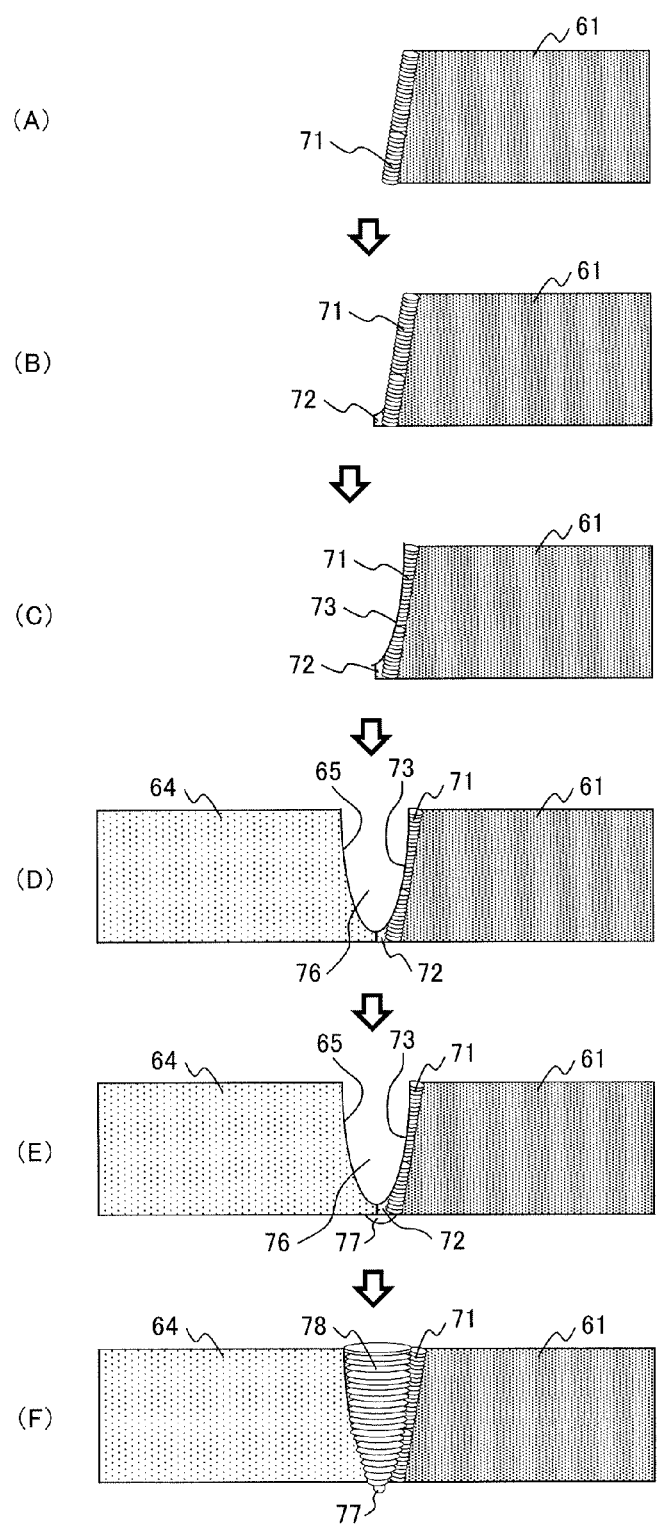
FIG. 8 is a continuous cross-sectional view showing the welding process of example 2.

FIG. 8 is a continuous cross-sectional view showing the welding step of example 2.

Similar to FIG. 6, in the present drawing also, the dotted line section 28 of FIG. 2B is enlarged, deformed into a flat plane shape, and is shown in (A) to (F).

In the present example, the point different from example 1 mainly is the step shown in (A).

In (A), an entire surface buttering section 71 is formed in the high temperature side rotor base material 61 beforehand prior to applying a buildup welding section 72 (before (B)).

The thickness in the axial direction of the entire surface buttering section 71 is 5 mm or more and 15 mm or less (5 to 15 mm). When the thickness is thinner than 5 mm, there may be an effect of dilution of the deposited metal for regular welding. Also, when the thickness is thicker than 15 mm, the effect of dilution of the deposited metal for regular welding is eliminated, however increase of the execution time is worried about.

The steps thereafter are same to those of example 1.

More specifically, a groove 73 is formed in (C) of FIG. 8, a gap 76 is formed by making the high temperature side rotor base material 61 and the low temperature side rotor base material 64 butt against each other in (D), a penetration bead 77 is formed in (E), and the gap 76 is subjected to butt welding using a weld metal 78 in (F).

Example 3

Figure 9:
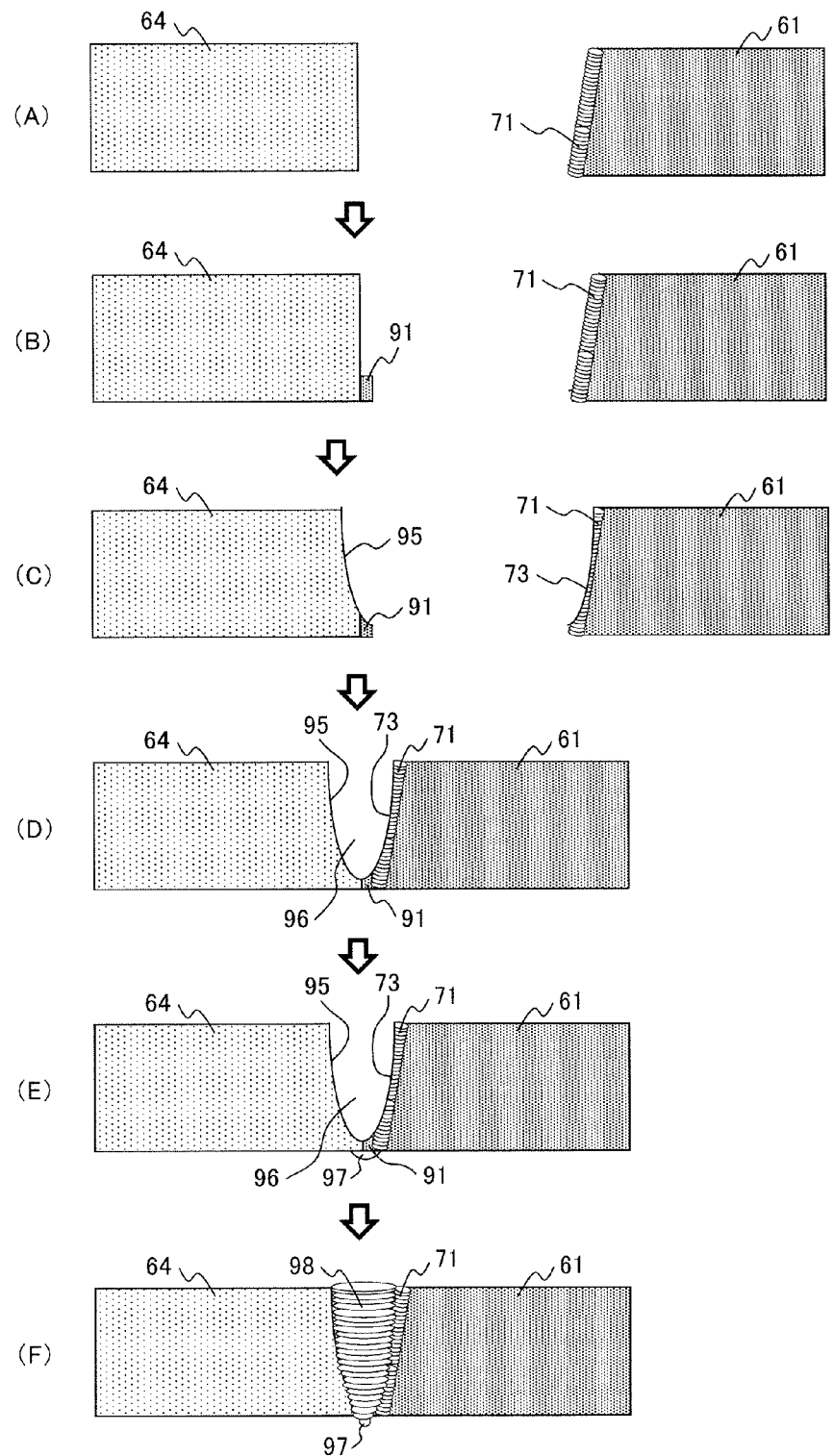
FIG. 9 is a continuous cross-sectional view showing a welding process of example 3.

FIG. 9 is a continuous cross-sectional view showing the welding step of example 3.

The points of the present example different from those of example 2 will be described using the present drawing.

In example 2, a buildup welding section 72 is arranged in a part of the entire surface buttering section 71. On the other hand, in the present example, a buildup welding section 91 is arranged in the low temperature side rotor base material 64 (B), and a groove 95 is formed (C). Also, a gap 96 is formed by making the high temperature side rotor base material 61 and the low temperature side rotor base material 64 butt against each other (D), a penetration bead 97 is formed (E), and the gap 96 is subjected to butt welding using a weld metal 98 (F).

Example 4

In the present example, as the rotor base material different from that of example 1, the Ni—Fe-based super alloy and 12% Cr steel were employed out of the rotor base materials shown in Table 1. More specifically, the present example is different from example 1 only in the chemical composition of the rotor base material, and is same in the welding step and others.

The thermal property of the rotor base material of an alloy whose main composition is Ni causes the problems similar to those of example 1 different from the rotor base material of the iron-based alloy material. Accordingly, the problems can be solved by a procedure same to that of example 1.

Example 5

In the present example, as the rotor base materials which are different from those of example 1, the Ni-based super alloy and 1% Cr—Mo—V steel were employed out of the rotor base materials shown in Table 1. More specifically, the present example is different from example 1 only in the chemical composition of the rotor base material, and is same in the welding step and others.

The thermal property of the rotor base material of an alloy whose main composition is Ni causes the problems similar to those of example 1 different from the rotor base material of the iron-based alloy material. Accordingly, the problems can be solved by a procedure same to that of example 1.

Example 6

In the present example, as the rotor base materials which are different from those of example 1, the Ni—Fe-based super alloy and 1% Cr—Mo—V steel were employed out of the rotor base materials shown in Table 1. More specifically, the present example is different from example 1 only in the chemical composition of the rotor base material, and is same in the welding step and others.

The thermal property of the rotor base material of an alloy whose main composition is Ni causes the problems similar to those of example 1 different from rotor base material of the iron-based alloy material. Accordingly, the problems can be solved by a procedure same to that of example 1.

What is claimed is:

1. A turbine rotor comprising:
a high temperature side rotor base material; and
a low temperature side rotor base material,
the high temperature side rotor base material and the low temperature side rotor base material respectively including concavities and grooves,
the turbine rotor having an enclosed space section formed by the concavity of the high temperature side rotor base material and the concavity of the low temperature side rotor base material being disposed opposingly, and a gap formed by the groove of the high temperature side rotor base material and the groove of the low temperature side rotor base material being disposed opposingly,
the turbine rotor containing a buildup welding section formed between the high temperature side rotor base material and the low temperature side rotor base material,
wherein the buildup welding section has the same composition as that of the high temperature side rotor base material or the low temperature side rotor base material, and has a penetration bead on the enclosed space section side, and the gap contains a weld metal filled therein; and
wherein a ratio of a thermal conductivity of the high temperature side rotor base material and the low temperature side rotor base material is in the range of 2/3 to 3/2.

2. The turbine rotor according to claim 1,
wherein the high temperature side rotor base material has an entire surface buttering section on a surface of the groove.

3. The turbine rotor according to claim 1,
wherein the high temperature side rotor base material is of a nickel-based alloy consisting of
cobalt (Co): 5 to 15 mass %;
chromium (Cr): 13 to 15.5 mass %;
aluminum (Al): 4.0 to 5.5 mass %;
titanium (Ti): 0.1 to 2.0 mass %;
niobium (Nb): 0.1 to 1.0 mass %;
tantalum (Ta): 0.1 to 3.0 mass %;
molybdenum (Mo): 0.1 to 2.0 mass %;
tungsten (W): 4.5 to 10 mass %;
hafnium (Hf): 0.1 to 2.0 mass %;
carbon (C): 0.05 to 0.20 mass %;
boron (B): 0.001 to 0.03 mass %; and
zirconium (Zr): 0.01 to 0.1 mass %, with the balance being nickel (Ni) and unavoidable impurities.

4. The turbine rotor according to claim 1,
wherein the low temperature side rotor base material is of 12% chromium steel having a totally tempered martensitic structure containing
carbon (C): 0.1 to 0.2 mass %;
manganese (Mn): 0.3 to 1.0 mass %;
nickel (Ni): 1 mass % or less;
chromium (Cr): 9 to 13 mass %;
molybdenum (Mo): 0.1 to 1.5 mass %;
tungsten (W): 0.2 to 5.0 mass %;
niobium (Nb): 0.02 to 0.1 mass %; and
cobalt (Co): 3 mass % or less.

5. The turbine rotor according to claim 1,
wherein the low temperature side rotor base material is of 1% chromium-molybdenum-vanadium steel having a bainitic structure containing
carbon (C): 0.25 to 0.35 mass %;
manganese (Mn): 0.5 to 1 mass %;
nickel (Ni): 1 mass % or less;
chromium (Cr): 0.8 to 1.5 mass %;
molybdenum (Mo): 1.0 to 1.5 mass %; and
vanadium (V): 0.2 to 0.3 mass %.

6. The turbine rotor according to claim 1,
wherein the high temperature side rotor base material is of a nickel-based alloy consisting of
cobalt (Co): 5 to 15 mass %;
chromium (Cr): 13 to 15.5 mass %;
aluminum (Al): 4.0 to 5.5 mass %;
titanium (Ti): 0.1 to 2.0 mass %;
niobium (Nb): 0.1 to 1.0 mass %;
tantalum (Ta): 0.1 to 3.0 mass %;
molybdenum (Mo): 0.1 to 2.0 mass %;
tungsten (W): 4.5 to 10 mass %;
hafnium (Hf): 0.1 to 2.0 mass %;
carbon (C): 0.05 to 0.20 mass %;
boron (B): 0.001 to 0.03 mass %; and
zirconium (Zr): 0.01 to 0.1 mass %, with the balance being nickel (Ni) and unavoidable impurities, and
the low temperature side rotor base material is of 12% chromium steel having a totally tempered martensitic structure containing
carbon (C): 0.1 to 0.2 mass %;
manganese (Mn): 0.3 to 1.0 mass %;
nickel (Ni): 1 mass % or less;
chromium (Cr): 9 to 13 mass %;
molybdenum (Mo): 0.1 to 1.5 mass %;
tungsten (W): 0.2 to 5.0 mass %;
niobium (Nb): 0.02 to 0.1 mass %; and
cobalt (Co): 3 mass % or less,
or of 1% chromium-molybdenum-vanadium steel having a bainitic structure containing
carbon (C): 0.25 to 0.35 mass %;
manganese (Mn): 0.5 to 1 mass %;
nickel (Ni): 1 mass % or less;
chromium (Cr): 0.8 to 1.5 mass %;
molybdenum (Mo): 1.0 to 1.5 mass %; and
vanadium (V): 0.2 to 0.3 mass %.

7. The turbine rotor according to claim 1,
wherein the high temperature side rotor base material is of a nickel-based alloy consisting of
cobalt (Co): 5 to 15 mass %;
chromium (Cr): 13 to 15.5 mass %;
aluminum (Al): 4.0 to 5.5 mass %;
titanium (Ti): 0.1 to 2.0 mass %;
niobium (Nb): 0.1 to 1.0 mass %;
tantalum (Ta): 0.1 to 3.0 mass %;
molybdenum (Mo): 0.1 to 2.0 mass %;
tungsten (W): 4.5 to 10 mass %;
hafnium (Hf): 0.1 to 2.0 mass %;
carbon (C): 0.05 to 0.20 mass %;
boron (B): 0.001 to 0.03 mass %; and
zirconium (Zr): 0.01 to 0.1 mass %, with the balance being nickel (Ni) and unavoidable impurities; and
the low temperature side rotor base material is of 12% chromium steel having a totally tempered martensitic structure containing
carbon (C): 0.1 to 0.2 mass %;
manganese (Mn): 0.3 to 1.0 mass %;
nickel (Ni): 1 mass % or less;
chromium (Cr): 9 to 13 mass %;
molybdenum (Mo): 0.1 to 1.5 mass %;
tungsten (W): 0.2 to 5.0 mass %;
niobium (Nb): 0.02 to 0.1 mass %; and
cobalt (Co): 3 mass % or less.

8. The turbine rotor according to claim 1,
wherein the high temperature side rotor base material is of
    a nickel-based alloy consisting of
cobalt (Co): 5 to 15 mass %;
chromium (Cr): 13 to 15.5 mass %;
aluminum (Al): 4.0 to 5.5 mass %;
titanium (Ti): 0.1 to 2.0 mass %;
niobium (Nb): 0.1 to 1.0 mass %;
tantalum (Ta): 0.1 to 3.0 mass %;
molybdenum (Mo): 0.1 to 2.0 mass %;
tungsten (W): 4.5 to 10 mass %;
hafnium (Hf): 0.1 to 2.0 mass %;
carbon (C): 0.05 to 0.20 mass %;
boron (B): 0.001 to 0.03 mass %; and
zirconium (Zr): 0.01 to 0.1 mass %, with the balance being nickel (Ni) and unavoidable impurities,
or of a nickel-iron-based alloy consisting of
iron (Fe): 30 to 40 mass %;
chromium (Cr): 14 to 16 mass %;
titanium (Ti): 1.2 to 1.7 mass %;
aluminum (Al): 1.1 to 1.5 mass %;
niobium (Nb): 1.9 to 2.7 mass %; and
carbon (C): 0.05 mass % or less; with the balance being nickel (Ni) and unavoidable impurities, and
the low temperature side rotor base material is of 12% chromium steel having a totally tempered martensitic structure containing
carbon (C): 0.1 to 0.2 mass %;
manganese (Mn): 0.3 to 1.0 mass %;
nickel (Ni): 1 mass % or less;
chromium (Cr): 9 to 13 mass %;
molybdenum (Mo): 0.1 to 1.5 mass %;
tungsten (W): 0.2 to 5.0 mass %;
niobium (Nb): 0.02 to 0.1 mass %; and
cobalt (Co): 3 mass % or less,
or of 1% chromium-molybdenum-vanadium steel having a bainitic structure containing
carbon (C): 0.25 to 0.35 mass %;
manganese (Mn): 0.5 to 1 mass %;
nickel (Ni): 1 mass % or less;
chromium (Cr): 0.8 to 1.5 mass %;
molybdenum (Mo): 1.0 to 1.5 mass %; and
vanadium (V): 0.2 to 0.3 mass %.

9. The turbine rotor according to claim 1,
wherein the high temperature side rotor base material is of
    a nickel-based alloy consisting of
cobalt (Co): 5 to 15 mass %;
chromium (Cr): 13 to 15.5 mass %;
aluminum (Al): 4.0 to 5.5 mass %;
titanium (Ti): 0.1 to 2.0 mass %;
niobium (Nb): 0.1 to 1.0 mass %;
tantalum (Ta): 0.1 to 3.0 mass %;
molybdenum (Mo): 0.1 to 2.0 mass %;
tungsten (W): 4.5 to 10 mass %;
hafnium (Hf): 0.1 to 2.0 mass %;
carbon (C): 0.05 to 0.20 mass %;
boron (B): 0.001 to 0.03 mass %; and
zirconium (Zr): 0.01 to 0.1 mass %, with the balance being nickel (Ni) and unavoidable impurities,
or of a nickel-iron-based alloy consisting of
iron (Fe): 30 to 40 mass %;
chromium (Cr): 14 to 16 mass %;
titanium (Ti): 1.2 to 1.7 mass %;
aluminum (Al): 1.1 to 1.5 mass %;
niobium (Nb): 1.9 to 2.7 mass %; and
carbon (C): 0.05 mass % or less; with the balance being nickel (Ni) and unavoidable impurities, and
the low temperature side rotor base material is of 12% chromium steel having a totally tempered martensitic structure containing
carbon (C): 0.1 to 0.2 mass %;
manganese (Mn): 0.3 to 1.0 mass %;
nickel (Ni): 1 mass % or less;
chromium (Cr): 9 to 13 mass %;
molybdenum (Mo): 0.1 to 1.5 mass %;
tungsten (W): 0.2 to 5.0 mass %;
niobium (Nb): 0.02 to 0.1 mass %; and
cobalt (Co): 3 mass % or less.

10. A steam turbine including the turbine rotor according to claim 1.

11. A turbine rotor comprising:
a high temperature side rotor base material; and
a low temperature side rotor base material,
the high temperature side rotor base material and the low temperature side rotor base material respectively including concavities and grooves,
the turbine rotor having an enclosed space section formed by the concavity of the high temperature side rotor base material and the concavity of the low temperature side rotor base material being disposed opposingly, and a gap formed by the groove of the high temperature side rotor base material and the groove of the low temperature side rotor base material being disposed opposingly,
the turbine rotor containing a buildup welding section formed between the high temperature side rotor base material and the low temperature side rotor base material,
wherein the buildup welding section has the same composition as that of the high temperature side rotor base material or the low temperature side rotor base material, and has a penetration bead on the enclosed space section side, and the gap contains a weld metal filled therein; and
wherein the high temperature side rotor base material is of a nickel-iron-based alloy consisting of
iron (Fe): 30 to 40 mass %;
chromium (Cr): 14 to 16 mass %;
titanium (Ti): 1.2 to 1.7 mass %;
aluminum (Al): 1.1 to 1.5 mass %;
niobium (Nb): 1.9 to 2.7 mass %; and
carbon (C): 0.05 mass % or less; with the balance being nickel (Ni) and unavoidable impurities.

12. A manufacturing method of a turbine rotor which includes:
a high temperature side rotor base material; and
a low temperature side rotor base material,
the high temperature side rotor base material and the low temperature side rotor base material respectively including concavities and grooves,
the turbine rotor having an enclosed space section formed by the concavity of the high temperature side rotor base material and the concavity of the low temperature side rotor base material being disposed opposingly, and a gap formed by the groove of the high temperature side rotor base material and the groove of the low temperature side rotor base material being disposed opposingly,
the manufacturing method comprising the steps of:
a buttering buildup step for subjecting a butting section of the high temperature side rotor base material or the low temperature side rotor base material to buttering buildup;
a penetration bead forming step for fusing the butting section and forming the penetration bead;

a regular welding step for filling the gap with the weld metal; and wherein a ratio of a thermal conductivity of the high temperature side rotor base material and the low temperature side rotor base material is in the range of 2/3 to 3/2.

13. The manufacturing method according to claim 12, further comprising a groove working step for subjecting the high temperature side rotor base material and the low temperature side rotor base material to groove work after the buttering buildup step, the penetration bead forming step executed thereafter.

14. The manufacturing method according to claim 12, further comprising a buttering step for forming an entire surface buttering section on a surface of the groove of the high temperature side rotor base material before the buttering buildup step.

\* \* \* \* \*